(12) United States Patent
Ishii et al.

(10) Patent No.: US 6,762,572 B1
(45) Date of Patent: Jul. 13, 2004

(54) ELECTRIC MACHINE, ELECTRIC MACHINE SYSTEM

(75) Inventors: Hiroshi Ishii, Tachikawa (JP); Takashi Aoki, Tachikawa (JP); Nobuyuki Kasuga, Atsugi (JP)

(73) Assignee: Tokyo R & D Co., Ltd., Tokyo (JP)

( * ) Notice: Subject to any disclaimer, the term of this patent is extended or adjusted under 35 U.S.C. 154(b) by 86 days.

(21) Appl. No.: 10/129,972

(22) PCT Filed: Oct. 12, 2000

(86) PCT No.: PCT/JP00/07079
§ 371 (c)(1),
(2), (4) Date: May 22, 2002

(87) PCT Pub. No.: WO01/38122
PCT Pub. Date: May 31, 2001

(30) Foreign Application Priority Data

Nov. 22, 1999 (JP) ............................................ 11/332106

(51) Int. Cl.⁷ ................................................ B80L 1/00
(52) U.S. Cl. ...................................... 318/139; 323/282
(58) Field of Search ......................... 318/139; 307/9.1; 323/282

(56) References Cited

U.S. PATENT DOCUMENTS

| | | | | |
|---|---|---|---|---|
| 3,863,209 A | * | 1/1975 | Hollins | ....................... 180/270 |
| 4,649,286 A | * | 3/1987 | Takeda et al. | ............. 307/10.1 |
| 5,396,970 A | * | 3/1995 | Ono | ........................... 180/220 |
| 5,521,443 A | | 5/1996 | Imura et al. | |
| 5,592,029 A | * | 1/1997 | Hollstein et al. | ............ 307/9.1 |
| 5,973,917 A | | 10/1999 | White | |

FOREIGN PATENT DOCUMENTS

| | | |
|---|---|---|
| JP | 53-96117 | 8/1978 |
| JP | 6-62503 | 3/1994 |
| JP | 7-111702 | 4/1995 |
| JP | 10-295001 | 11/1998 |

OTHER PUBLICATIONS

Patent Abstracts of Japan, vol. 1999, No. 02, Feb. 26, 1999.

* cited by examiner

*Primary Examiner*—Bentsu Ro
(74) *Attorney, Agent, or Firm*—Westerman, Hattori, Daniels & Adrian, LLP

(57) ABSTRACT

An electric device (1) in which a driver (4) drives an electric motor (5) by use of electric power supplied from a power supply (2) having a rechargeable secondary battery, and a controller (3) monitors, manages, and controls the driver and the whole device, is provided with a portable device power supply (7) to which a portable device (10) is connectable and which supplies electric power supplied from the power supply (2) to the connected portable device (10) and a portable device interface means (16) for communicating information with the connected portable device (10).

14 Claims, 10 Drawing Sheets

F I G. 7
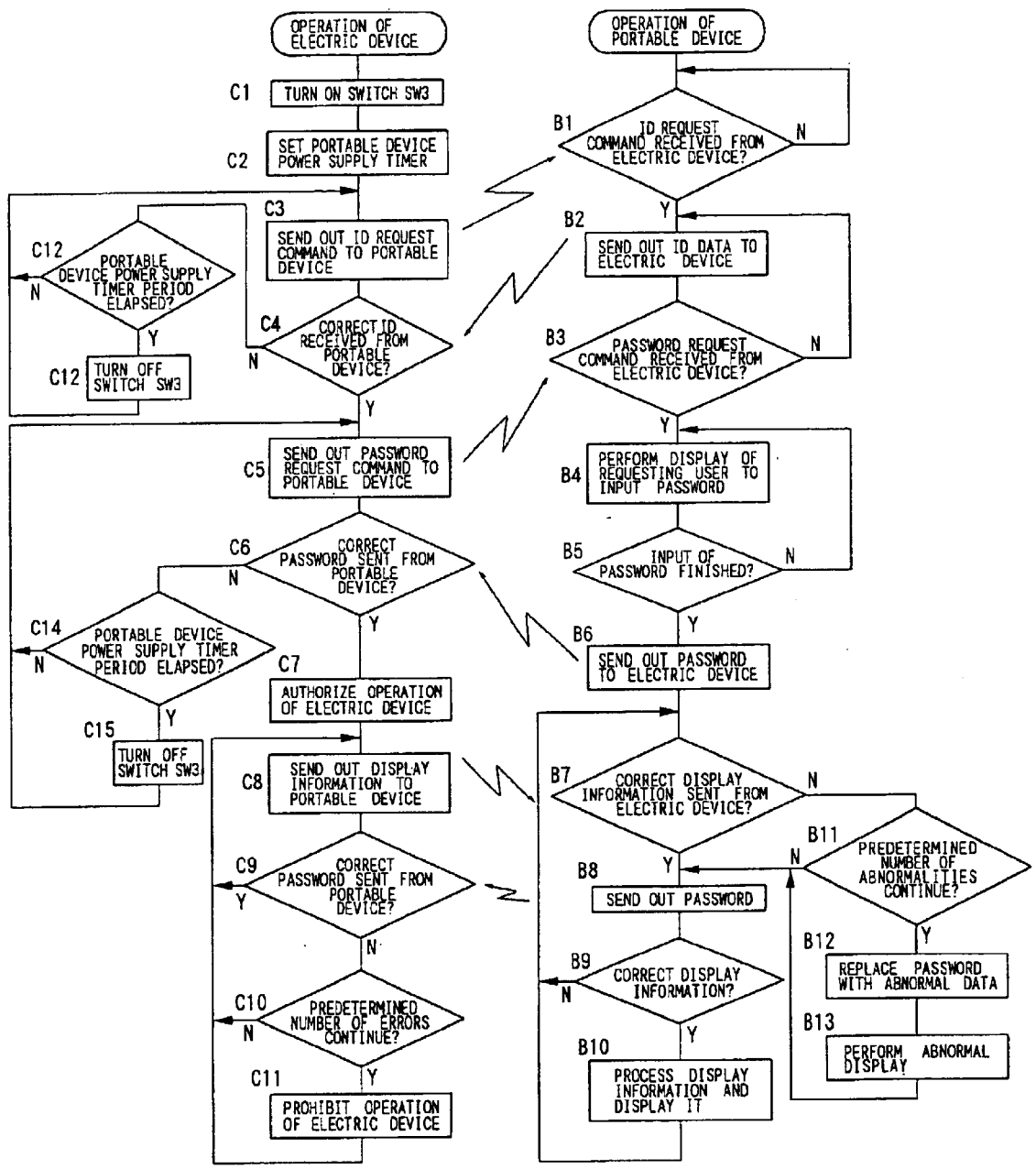

US 6,762,572 B1

ELECTRIC MACHINE, ELECTRIC MACHINE SYSTEM

TECHNICAL FIELD

The present invention relates to an electric device being a small electric mobile unit such as an electric scooter, an electric bicycle, an electric wheelchair, an electric cart, an electric walker for an aged person, or the like, which uses a relatively large secondary battery as a power source, and to an electric device system in which the electric device is connected with a portable device (a portable-type information processing device) such as a notebook personal computer or the like and supplies electric power thereto and the portable device is made usable as a display means or an inputting means.

BACKGROUND TECHNOLOGY

Conventionally, there is an electric vehicle including a storage battery pack composed of a plurality of storage batteries mounted as a power source such as an electric bicycle or an electric wheel chair. Among electric vehicles of this type, some run only by a driving force of a motor which is driven by electric energy (electric power) from the mounted storage battery pack, some run by a resultant force of a driving force of a motor and human power, some switch and use a driving force of a gasoline engine and a driving force of a motor, and the like.

There is a need of using portable devices such as a palmtop personal computer, a notebook personal computer and the like in these conventional small electric vehicles. In the status quo, however, when these small electric vehicles are moving, it is impossible to use these portable devices in operation of the electric vehicles and thus the portable devices are only a burden. Further, the aforementioned portable devices are operated by a battery, and therefore there is a demand that the battery always be kept in a state of being fully charged or nearly fully charged to eliminate occurrence of a problem of battery exhaustion during their use.

Furthermore, these portable devices have display ability capable of sufficiently displaying a speedometer, a tachometer, a fuel gauge, an odometer (an integrating traveling distance meter), a tripmeter (an integrating traveling distance meter with a reset function), and so on, necessary in an instrument panel of the electric vehicle.

In a conventional four-wheeled vehicle such as a gasoline-powered vehicle, a vehicle driven by combination of gasoline and a battery, an electric vehicle, or the like, the vehicle has a power supply such as a rather large battery or power generator for the performance of the vehicle, or a large number of electronic devices already exist in a car. Therefore, the power supply is taken outside as a power source for the aforesaid portable devices, which has facilitated the supply of electric power to the portable devices.

On the other hand, in the case of a small two-wheeled vehicle such as a scooter, not many vehicles have a device called an electronic device attended therein in the status quo, in which some vehicles have a very small battery as a power source or some do not even have such a battery. Further, the small battery itself has great noise from a power generator coupled to a small engine and large variation in voltage, and thus it is a less-than-stable power source.

Moreover, even in a small electric vehicle such as an electric bicycle, an electric wheelchair, an electric cart, an electric walker for an aged person, or the like, having thereon a relatively large battery and being capable of supplying a relatively stable power supply, there is no vehicle that supplies a power supply to the outside. The portable devices carried by the small electric vehicles during movement become only a burden as general baggage, and the vehicles can not prepare (charge or the like) for their use.

It is an object of the present invention to improve the aforementioned conventional disadvantage in the small electric device, more specifically to make it possible to supply power to a portable device, particularly to a portable information processing device including an input means and a display means so as to effectively use display/input functions thereof, and thereby, by the use of an ID or a password from the portable device connected thereto, to improve the prevention of unauthorized use and theft of the electric device.

DISCLOSURE OF THE INVENTION

In order to attain the above objects, the present invention provides an electric device and an electric device system configured as follows:

An electric device according to the invention has a power supply including a rechargeable secondary battery, an electric motor operated by electric power supplied from the power supply, a driver for driving the electric motor, and a controller for monitoring, managing, and controlling the driver and the whole device.

The electric device is characterized by comprising: a portable device power supply to which a portable device is connectable and which supplies electric power to the connected portable device; and a key switch having a first switch interposed in a main power line for supplying electric power from the power supply to the controller and the driver, and a second switch interposed in a power line for supplying electric power from the power supply to the portable device power supply, in which the first switch is turned on at a second key position and the second switch is turned on at a first key position and the second key position.

Alternatively, the electric device is characterized by comprising: a portable device power supply to which a portable device is connectable and which supplies to the connected portable device electric power supplied from the power supply; and a portable device interface means for communicating information with the connected portable device.

Further, an electric device system according to the invention is constituted by the aforesaid electric device and a portable device having a display and connected to the portable device power supply for communicating information with the electric device via the portable device interface means, and is characterized in that display information of the electric device is displayed on the portable device.

Alternatively, the electric device system may be constituted by the aforesaid electric device, and a portable device for communicating information with the electric device via the portable device interface means, connected to the portable device power supply, wherein the portable device is provided with means for sending out ID data of a program operating therein to the electric device, and the electric device is provided with means for determining authorization/prohibition of operation of the electric device based on the ID data received from the portable device.

Further, it is also preferable that the portable device is provided with means for sending out an inputted password to the electric device, and the electric device is provided with means for determining authorization/prohibition of operation of the electric device based on the password received from the portable device.

Furthermore, it is more preferable that the portable device is provided with means for sending out ID data of a program operating therein to the electric device and means for sending out an inputted password to the electric device, and the electric device is provided with means for determining authorization/prohibition of operation of the electric device based on the ID data and the password received from the portable device.

It is also possible that, in the electric device system, the electric device is provided with a switch for controlling a supply of electric power from the power supply to the portable device power supply, and means for enabling electric power supply from the portable device power supply by turning on the switch when at least one of the ID data and the password received from the portable device matches a previously registered ID data or password.

It is also possible that, in these electric device systems, the portable device is provided with means for sending out inputted operation mode specification information to the electric device, and the electric device is provided with means for controlling the operation of the electric device and/or operation of the portable device power supply in accordance with the operation mode specification information from the portable device.

It is desirable that the power supply in these electric devices or electric device systems is a power supply comprising a rechargeable battery unit constituted by paring a storage battery pack being the secondary battery and a memory for storing at least information on charge and discharge states of the storage battery pack.

BRIEF DESCRIPTION OF DRAWINGS

FIG. 7 is a flowchart showing operations of the electric device and a portable device shown in FIG. 6;

BEST MODE FOR CARRYING OUT THE INVENTION

Hereinafter, concrete embodiments of the invention will be described with reference to the drawings.

Figure 1:
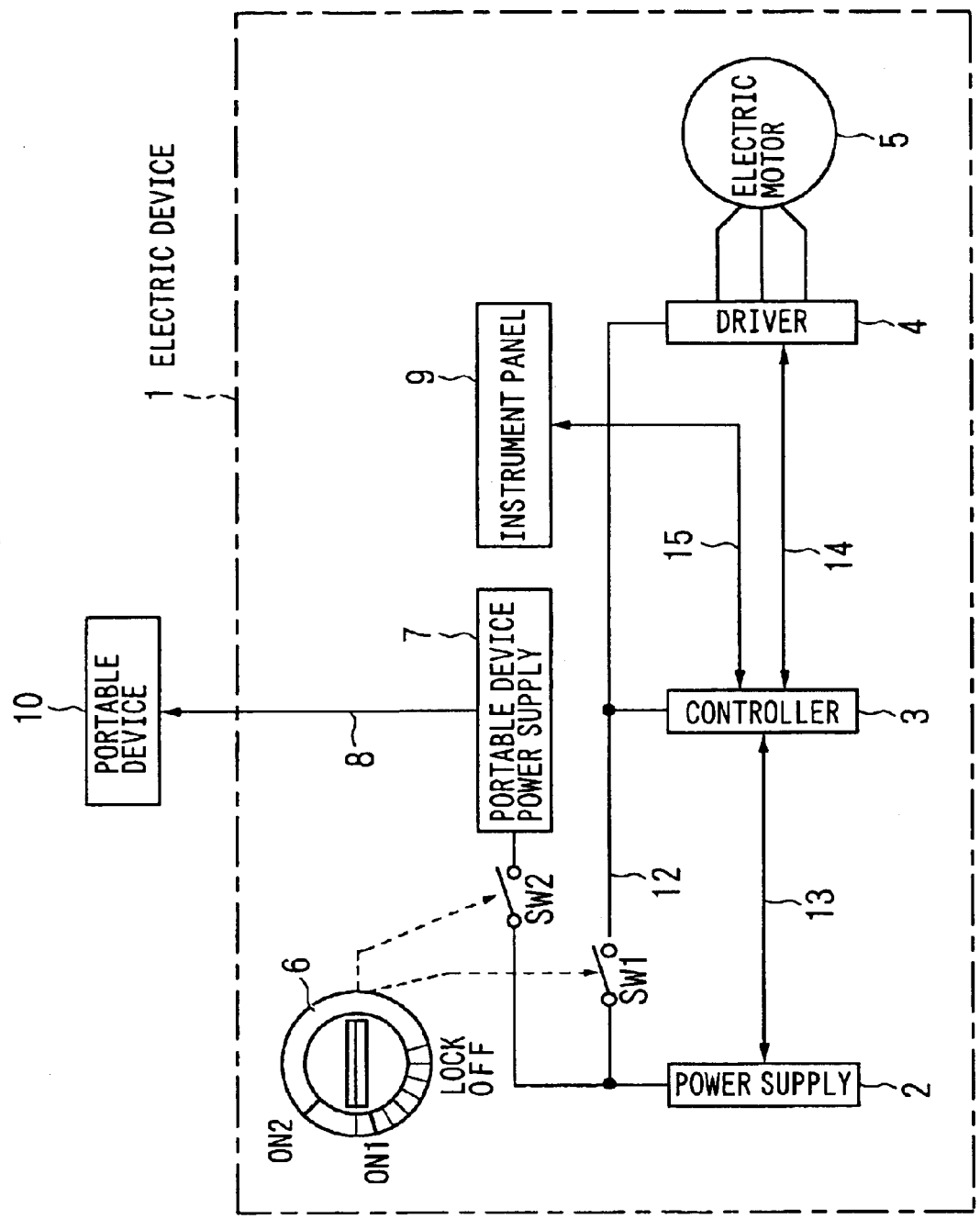
FIG. 1 is a block diagram showing a configuration of a first embodiment of an electric device according to the invention.

FIG. 1 is a block diagram showing a configuration of a first embodiment of an electric device according to the invention, in which a secondary battery such as a storage battery pack or the like is employed as a power supply to enable a supply of sufficient power to a portable device, and a display section of the portable device is made usable also as a display means of the electric device.

An electric device 1 is constituted by a configuration mainly including a power supply 2, a controller 3 for controlling each section of the electric device 1, a driver 4, an electric motor 5, a key switch 6, a portable device power supply 7, a portable device power line 8, an instrument panel 9, and so on.

The key switch 6 interlocks with a first switch SW1 and a second switch SW2 at two stages which are switched by inserting a key into a key hole and turning it, and a lock mechanism for an operating system including a steering wheel and the like which operates at a position where the key can be pulled out (a turning range with hatching in FIG. 1).

The power supply 2 is constituted by a rechargeable secondary battery such as a lead storage battery, a Ni-Cd storage battery, a Ni-MH storage battery, a lithium ion storage battery, or the like, and supplies electric power necessary for operating the electric device.

The first switch SW1 interlocks with the key switch 6 provided in the electric device 1 and turns on when the key switch 6 is operated to a second key position (ON2) to supply electric power of the power supply 2 to each section via a main power line 12. The controller 3 starts control of each section of the electric device 1 when the first switch SW1 turns on and power is supplied thereto via the main power line 12. When an instruction for operation is given by a user, although not shown in the drawing, the controller 3 cooperates with the driver 4 via a driver control signal line 14 to cause the electric motor 5 to operate, thereby operating the electric device 1.

Further, the controller 3 monitors states necessary as the electric device 1 such as a residual capacity of the secondary battery of the power supply 2, the state of the power supply 2 such as temperature and so on if necessary, the operating state of the electric motor 5, and so on, via a power supply control signal line 13, the driver control signal line 14, and the like; and displays information on the instrument panel 9 via an instrument panel I/F signal line 15, gives an alarm, and so on, in order to communicate necessary information to the user. Accordingly, the controller 3 monitors, manages, and controls the whole electric device 1.

The driver 4 receives the instruction from the controller 3 via the driver control signal line 14 to operate the electric device 1 and communicates information required by the controller 3 such as the number of rotation of the electric motor 5 or not shown wheels of the electric device 1, the temperature of the electric motor 5, and the like, via the driver control signal line 14.

The electric motor 5 is a power source driven by the driver 4 to rotate the wheels so as to cause the electric device 1 to run.

The portable device power supply 7 receives a supply of electric power from the power supply 2 when the key switch 6 is operated to a first key position (ON1) or the second key position (ON2) to turn on the second switch SW2, and supplies electric power necessary for a portable device 10 via the portable device power line 8.

The type of electric power supplied shall be a type required by the portable device 10, for example, direct current electric power by a DC/DC converter, or electric power of a commercial power supply by a DC/AC inverter (AC100 V in Japan).

A power outlet of the portable device power supply 7 is desirably provided in a helmet case that does not require a special device for holding the portable device 10.

Next, operations in the first embodiment are explained.

The key switch 6 can be removed in a range of a LOCK position shown with hatching in FIG. 1. In this event, the operation of the electric device 1 is in a stop state, where all the operating system including the steering wheel and the like is locked. However, when the key is pulled out at the first key position ON1 within the LOCK position, the second switch SW2 turns on while the electric device 1 is kept locked to allow electric power to be supplied to the portable device power supply 7, which makes it possible to supply electric power to the portable device 10.

As described above, the provision of the first key position ON1 of the key switch 6 within the range of the LOCK position enables the key to be pulled out at the first key position ON1, which makes it impossible for the electric device 1 to operate. This makes it possible to prevent theft as well as to maintain the supply of electric power to the portable device 10 to enable use of the portable device 10 such as a notebook personal computer or the like even in that state.

By inserting the key into the key switch 6 and turning it to the second key position ON2, the lock of the operating system including the steering wheel and the like is released, and the first switch SW1 turns on. This allows electric power to be supplied from the power supply 2 to the controller 3 and the driver 4 via the main power line 12 to bring the electric device 1 into a state capable of operating, and the electric power is also supplied to the portable device power supply 7 to maintain the supply of electric power to the portable device 10.

The controller 3 supplied with electric power starts control of the operation of the electric device 1 and cooperates with the driver 4 to operate the electric motor 5 when an instruction for operation is given by the user, although not shown in the drawing, thereby causing the electric device 1 to run.

Moreover, the controller 3 monitors states necessary as the electric device 1, that is, monitors a residual capacity of the secondary battery of the power supply 2, the state of the power supply 2 such as temperature and so on if necessary, via the power supply control signal line 13, also monitors the operating state of the electric motor 5 via the driver control signal line 14, and so on; and performs a display for communicating to the user information necessary for the user on the instrument panel 9 via the instrument panel I/F signal line 15, gives an alarm, and so on. Thus, the controller 3 has a function of monitoring, managing, and controlling the whole electric device 1.

Figure 2:
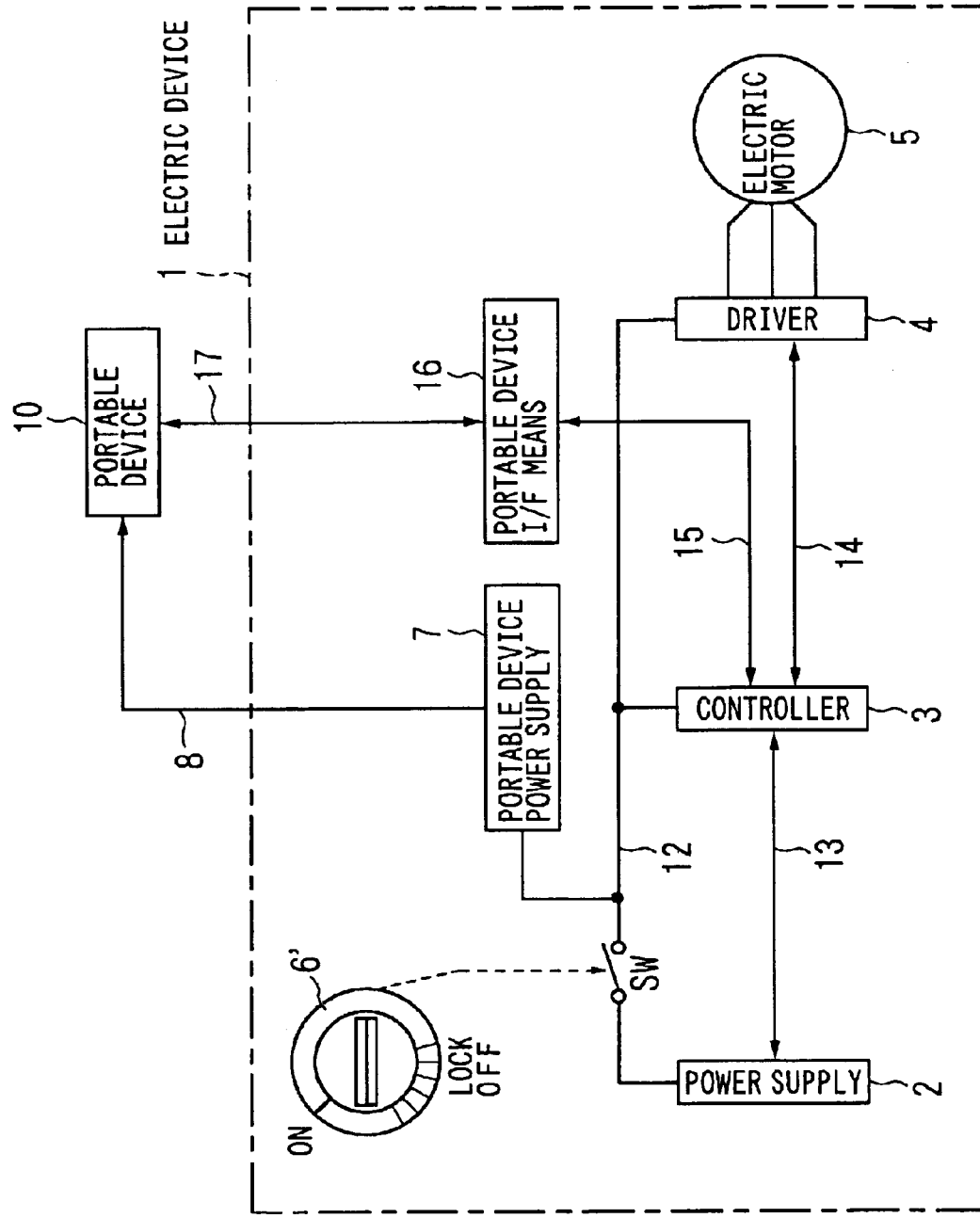
FIG. 2 is a block diagram showing a configuration of a second embodiment of an electric device according to the invention.

Next, a second embodiment of an electric device according to the invention is explained with FIG. 2 to FIG. 5. FIG. 2 is a block diagram showing a configuration of the second embodiment of the electric device, in which the same sections as those in FIG. 1 are assigned the same numerals and symbols.

The second embodiment differs from the first embodiment in that as for a key switch 6', while the key switch 6 in the first embodiment is a two-stage switch which turns on the second switch SW2 at the first key position ON1 and turns on both of the first switch SW1 and second switch SW2 at the second key position SW2, the key switch 6' in the second embodiment only turns on a switch SW at an ON position and turns off the switch SW at an OFF (LOCK) position to activate a lock mechanism of an operating system. Therefore, there is no switch corresponding to the second switch SW2 shown in FIG. 1.

In place of the instrument panel 9 shown in FIG. 1, a portable device interface means (hereinafter, abbreviated to a "portable device I/F means") 16 and a portable device I/F signal line 17 are provided. The other configuration is common with the electric device of the first embodiment shown in FIG. 1, and thus the description thereof is omitted.

Therefore, operations of a power supply 2, a controller 3, a driver 4, an electric motor 5, and the like are the same as those explained in the first embodiment, and thus the description thereof is omitted here. Only operations of sections differing from those of the first embodiment are explained.

The switch SW turns on when the key switch 6' provided in the electric device 1 is turned to the ON position by the key inserted into the key hole to allow electric power of the power supply 2 to be supplied to each section via a main power line 12.

The fact that the key switch 6' being only in ON-OFF (LOCK) state is used here in stead of using the key switch 6 having functions of the first switch SW1 and the second switch SW2 as in the first embodiment does not have a serious meaning but means that the object of the invention can be attained even with a simple one-stage key switch. Accordingly, a two-stage key switch may be used, when necessary, as in the first embodiment.

A portable device power supply 7 receives a supply of electric power from the power supply 2 when the switch SW is turned on by the key switch 6' to supply electric power required by a portable device 10 via a portable device power line 8. The type of electric power supplied shall be direct current electric power or electric power of the commercial power required by the portable device 10.

The portable device I/F means 16 receives information required by a user from the controller 3 via the instrument panel I/F signal line 15, converts it into a signal appropriate for the portable device 10, and sends it out to the portable device 10 via the portable device I/F signal line 17. When the portable device 10 such as a notebook personal computer or the like connected to the portable device power line 8 receives the signal from the portable device I/F signal line 17, the portable device 10 displays it on its own display section (a liquid crystal display or the like).

Further, when the portable device I/F means 16 receives via the portable device I/F signal line 17 information from the portable device 10, for example, password information for authorization to operate the electric device 1, the portable device I/F means 16 communicates it to the controller 3 via the instrument panel I/F signal line 15.

It should be noted that, instead of independently providing the portable device I/F means 16 as in this embodiment, its function may be given to the controller 3.

Figure 3:
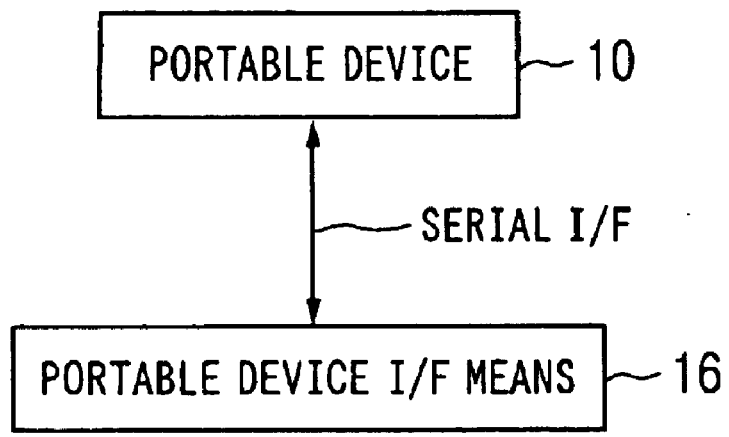
FIG. 3 is a block diagram showing an example of a portable device I/F signal line in FIG. 2.
Figure 4:
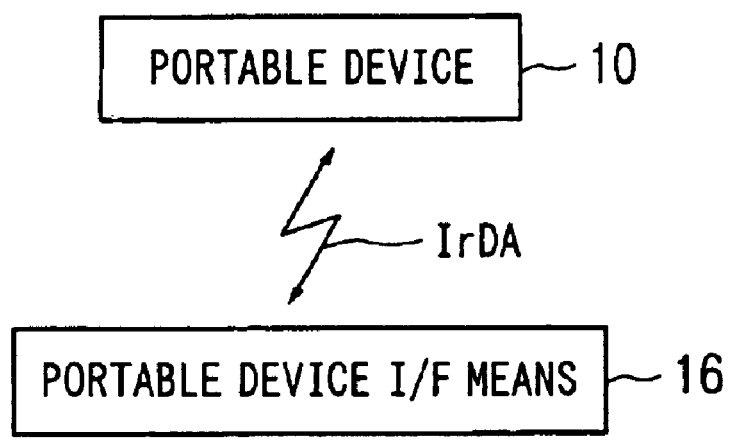
FIG. 4 is a block diagram showing another example of the portable device I/F signal line in FIG. 2.

Further, as the scheme of the portable device I/F signal line 17, a serial I/F (interface) shown in FIG. 3 which is typically installed in a palmtop personal computer, a notebook personal computer, and the like, or an IrDA of infrared data communication as shown in FIG. 4 is employed, which allows the portable device I/F signal line 17 to provide for many types of devices.

It is necessary to add to the portable device 10 control software to realize a display of information and an alarm sent from the controller 3 through communication with the portable device I/F means 16 and to send out necessary information such as a password and the like to the controller 3.

Figure 5:
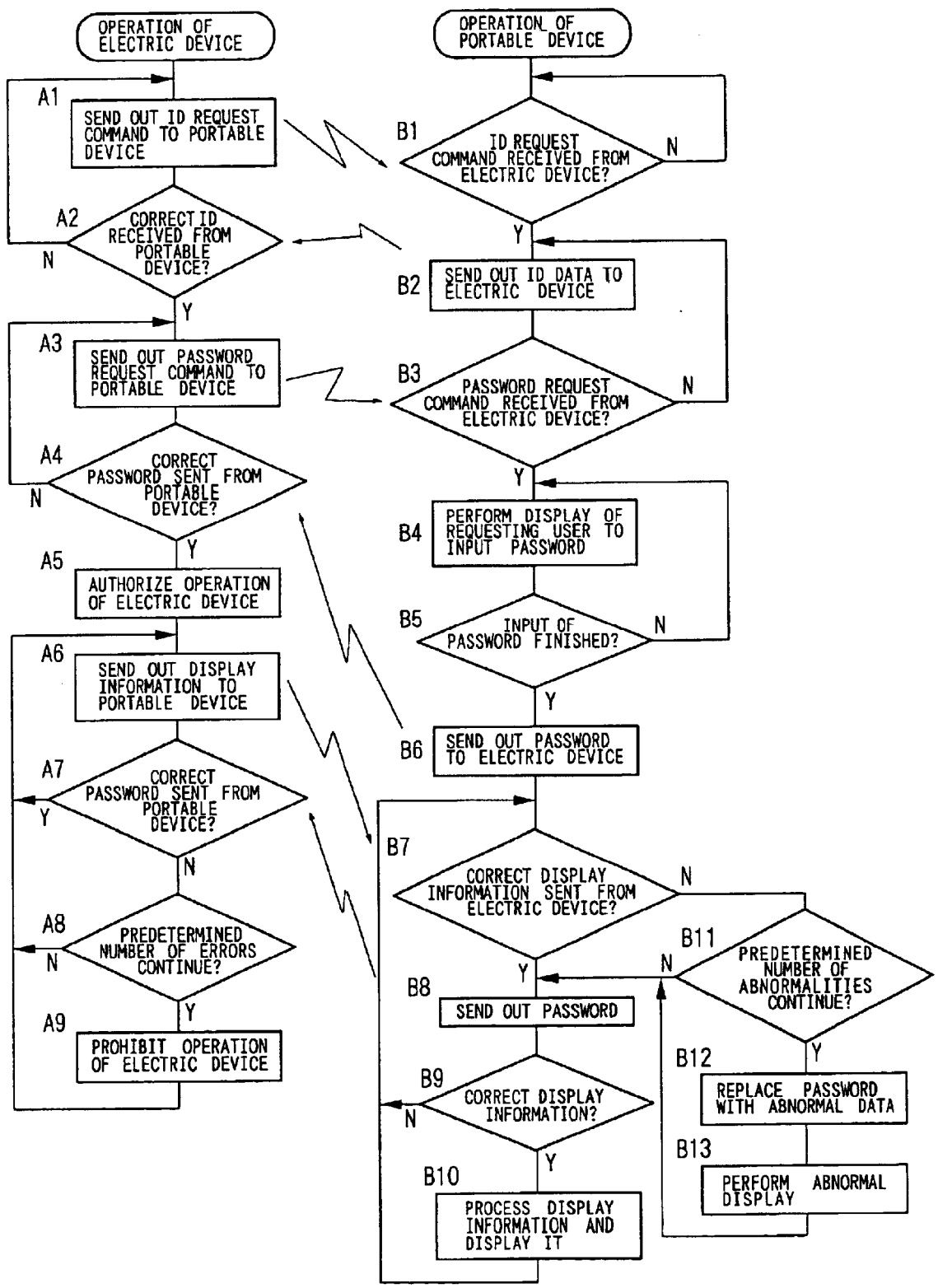
FIG. 5 is a flowchart showing operations of the electric device and a portable device shown in FIG. 2.

Next, specific operations in the case where the portable device is connected to the electric device of the second embodiment to input a password thereto are explained with a flowchart in FIG. 5. In FIG. 5, a flow of the operation of the electric device 1 in this case is shown on the left-hand side, a flow of the operation of the portable device 10 is shown on the right-hand side, and fold lines with arrows show mutual relationship therebetween.

In this embodiment, the switch SW is turned on by the key switch 6 of the electric device 1 to allow electric power of the power supply 2 to be supplied via the main power line 12 to each necessary section of the electric device 1, which enables operation thereof.

FIG. 5 shows a flowchart of the electric device 1 from the power thereof being turned on by the key switch until it becomes a state capable of operating, and communication of the electric device with the portable device 10 in operation.

In the electric device 1, the controller 3 sends out an ID request command to the portable device via the instrument panel I/F signal line 15, the portable device I/F means 16, and the portable device I/F signal line 17 in step A1, and waits for a response from the portable device 10 in step A2.

The ID is not an ID of the portable device 10 itself but shall be an ID of a program operating in the portable device 10, which eliminates limitation of portable devices.

The portable device 10 is waiting for the ID request command from the electric device 1 in step B1, and when the portable device 10 receives the ID request command from the electric device 1, it proceeds to step B2 and sends out ID data to the electric device in response to the request.

Then, the electric device 1, in step A2, receives the ID data sent out from the portable device 10 and verifies whether or not it is a correct ID which is registered in advance, returns to step A1 when it is different from the ID, and proceeds to step A3 when it is correct.

In step A3, the electric device 1 sends out a password request command for making a request to the user for a password for authorizing operation of the electric device 1 via the portable device 10, and waits for the password in step A4.

The portable device 10 returns to step B2 and sends out the ID data until the password request command is sent in step B3, and when the portable device 10 receives the password request command in step B3, it proceeds to step B4.

In step B4, the portable device 10 performs a display of requesting the user to input a password, and waits for input of a password in step B5. Any method may be employed for display contents and inputting a password if it is suitable for properties of the portable device.

The portable device 10 returns to step B4 and maintains the display of requesting input of a password until input of a password is finished in step B5, and proceeds to step B6 when the input of the password is finished.

In step B6, the portable device 10 stores the inputted password in a predetermined location by a predetermined method and sends out the password to the electric device.

The electric device 1 waits for the password being sent in step A4, and when receiving the password from the portable device 10, the electric device 1 compares it with the previously registered password, proceeds to step A5 when they match, and returns to step A3 when they do not match.

In step A5, the controller 3 authorizes the operation of the electric device 1 by a predetermined method, and the electric device 1 proceeds to step A6.

In step A6, the electric device 1 sends out to the portable device 10 display information obtained by combining operation authorization information and information required to be displayed on the portable device as the electric device, and proceeds to step A7. To this display information, parity and/or a checksum or the like are/is added to provide for discrimination of the information between correct and incorrect.

The portable device 10 checks the display information received from the electric device 1 in step B7, proceeds to step B8 when it is correct, and proceeds to step B11 when it is incorrect.

In step B8, the portable device 10 sends out a predetermined password to the electric device 1, and proceeds to step B9.

On the other hand, the electric device 1 is waiting for the password as a response to sending of the display information, in step A7. When receiving the password from the portable device 10, the electric device 1 verifies the password and returns to step A6 when it is correct, and the state of the electric device 1 authorized to operate is maintained. When the password is incorrect, the electric device 1 proceeds to step A8.

In step A8, the electric device 1 checks a series of errors of passwords, and proceeds to step A9 when the number of errors reaches a predetermined number. When the number of errors does not reach the predetermined number, the electric device 1 returns to step A6.

In step A9, the controller 3 brings the electric device 1 into a state of being prohibited to operate, and the electric device 1 returns to step A6. In this event, the display information sent out in step A6 changes from operation authorization to operation prohibition. It is conceivable that there are other elements to prohibit operation of the electric device, but the description thereof is not made because the elements are inherent in electric devices and can not be defined and they are not directly related to the invention.

The portable device 10 proceeds to step B10 when the information received in step B9 is correct, and returns to step B7 when it is incorrect to maintain the preceding display.

In step B10, the portable device 10 processes the display information and displays it, and returns to step B7. When proceeding from step B7 to step B11, the portable device 10 manages incorrect display information there, proceeds to step B12 when a predetermined number of abnormalities continues, and returns to step B8 when the number of abnormalities does not reach the predetermined number.

In step B12, the portable device 10 rewrites abnormal data (data differing from the password) over the password stored in the predetermined location, and proceeds step B13. The portable device 10 displays the abnormality, and thereafter returns to step B8 and sends out the password. Thereby, since an incorrect password is sent out to the electric device 1, the abnormality occurring in the display system is also detected on the electric device 1 side, so that the electric device 1 is brought into a state of being prohibited to operate.

The reason why the abnormality is displayed in step B13 is to report the abnormality to the user. Further, if the portable device 10 is provided with a function of generating a sound, it may generate an alarm. It is also preferable that when the portable device 10 receives operation prohibition information from the electric device 1, it may similarly generate an alarm.

As a result, in addition to the key switch 6, connection of the portable device 10 to the electric device 1 becomes a second key, and further the password becomes a third key, which makes it possible to improve the prevention of unauthorized use and theft.

While the operation of the electric device 1 is authorized by the password in the above-described example, it is possible to conduct a control only by the ID data without using the password.

In this case, the operation can be realized by omitting steps A3 and A4 on the electric device 1 side and steps B3, B4, B5 and B6 on the portable device 10 side and replacing "password" with "ID data" in other steps in the flowchart shown in FIG. 5.

In this case, while there is no provision for the password being the aforementioned third key, double protection against unauthorized use or the like can be attained.

Conversely, it is possible to conduct a control only by the password without using the ID. In this case, steps A1 and A2 on the electric device 1 side and steps B1 and B2 on the portable device 10 side in the flowchart shown in FIG. 5 should be omitted.

Further, even when the portable device 10 can not operate because of lack of battery capacity, it is possible to hold the system as well as to charge the battery of the portable device 10 by supplying electric power from the portable device power supply 7 to the portable device 10 via the portable device power line 8.

Next, a third embodiment of an electric device according to the invention is explained with reference to FIG. 6 and FIG. 7.

Figure 6:
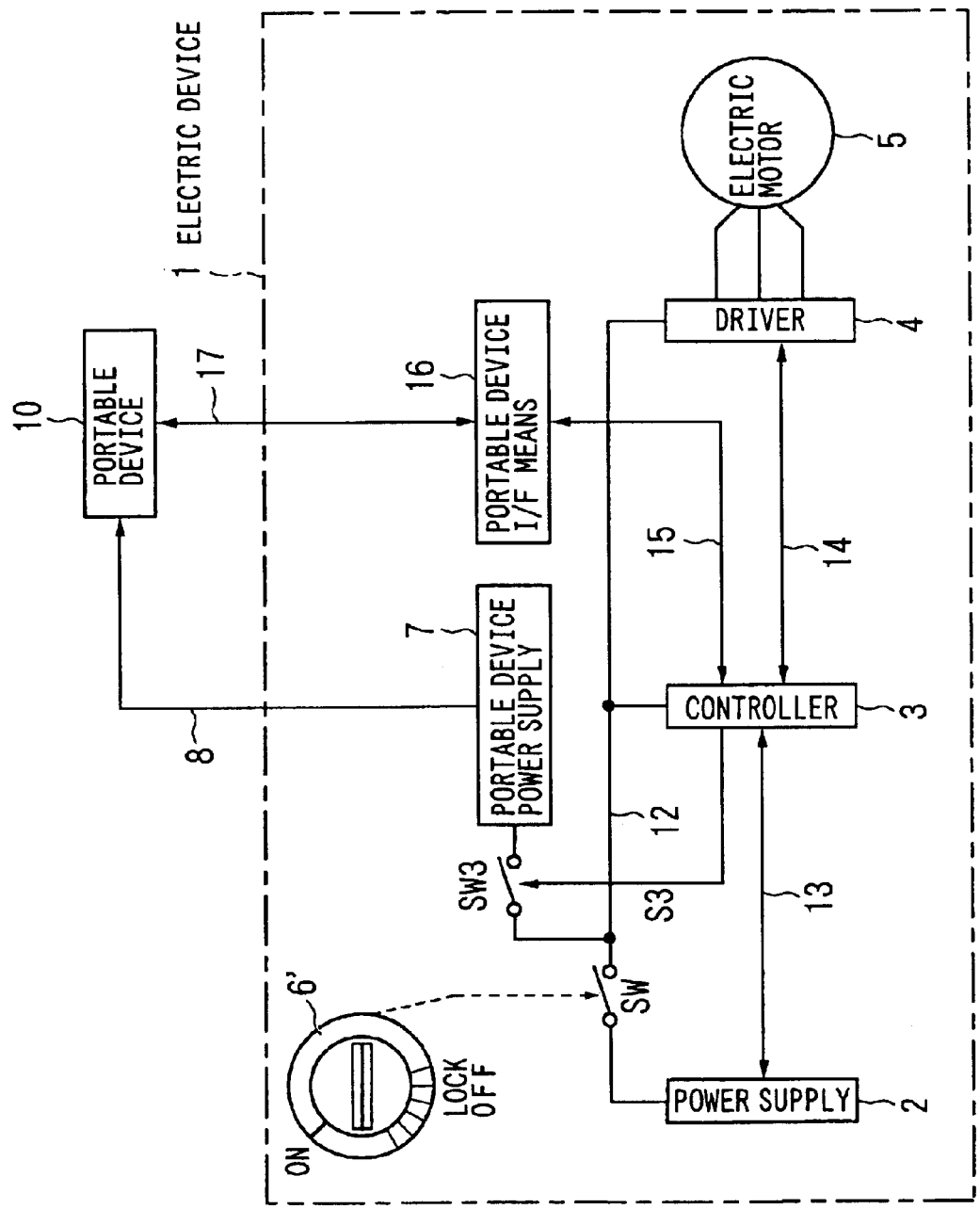
FIG. 6 is a block diagram showing a configuration of a third embodiment of an electric device according to the invention.

FIG. 6 is a block diagram showing a configuration of the electric device, in which the same sections as those in FIG. 1 and FIG. 2 are assigned the same numerals and symbols.

An electric device 1 of the third embodiment differs from that of the second embodiment shown in FIG. 2 only in that a switch SW3, which is ON/OFF controlled by a switch control signal S3 from a controller 3, is provided between a main power line 12 extending from a power supply 2 via a switch SW and a portable device power supply 7.

The switch SW is first turned on by operating a key switch 6' to allow electric power of the power supply 2 to be supplied to necessary sections of the electric device 1 via the main power line 12, which makes the electric device 1 capable of operating.

The switch SW3 is controlled by the switch control signal S3 from the controller 3 and turns on to allow electric power from the power supply 2 to be supplied to the portable device power supply 7.

When the switch SW turns on and electric power is supplied from the power supply 2, the controller 3 starts control of operation of the electric device 1. Further, the controller 3 has, in addition to the same function as that of the controller 3 of the second embodiment, a function of controlling opening/closing of the switch SW3 by the switch control signal S3 to control the supply of electric power to the portable device power supply 7.

Next, operation of the electric device of the third embodiment when a portable device is connected thereto is explained with FIG. 7.

FIG. 7 shows a flowchart of the electric device from the power thereof being turned on by the key switch until it becomes a state capable of operating, and communication of the electric device with the portable device in operation. It should be noted that steps B1 to B13 of the operation of the portable device on the right-hand side are the same as steps B1 to B13 of the operation of the portable device in the flowchart shown in FIG. 5, and thus the description thereof is omitted.

The electric device 1 starts operation when the switch SW turns on by operating the key switch 6' and electric power is supplied to the controller 3.

Then, in step C1, the electric device 1 first turns on the switch SW3 by the switch control signal to cause the portable device power supply 7 to operate for the case of a battery of a portable device 10 being uncharged, and proceeds to step C2.

In step C2, the electric device 1 sets a portable device power supply timer, and proceeds to step C3. The portable device power supply timer is a timer for specifying a period of operation of the portable device power supply to prevent power supply (charge) to the portable device 10 only by application of power caused by the key switch 6' and to reduce unnecessary power consumption.

In step C3, the controller 3 sends out an ID request command to the portable device 10 via an instrument panel I/F signal line 15, a portable device I/F means 16, and a portable device I/F signal line 17, and waits for a response from the portable device 10 in step C4.

Thereby, the portable device 10 sends out ID data in step B2, and when receiving the ID data, the electric device 1 verifies whether or not it is a previously registered ID in step C4. The electric device 1 proceeds to step C12 when it is different from the registered ID, and proceeds to step C5 when it is correct.

In step C5, the electric device 1 sends out a password request command for making a request to the user for a password for authorizing operation of the electric device 1 via the portable device, and waits for reception of the password in step C6.

When receiving the password from the portable device 10, the electric device 1 compares it with a previously registered password in step C6. When they match, the electric device 1 determines that the correct password has been sent from the portable device and proceeds to step C7, and when they do not match, it proceeds to step C14.

In step C7, the controller 3 authorizes the operation of the electric device 1 by a predetermined method, and the electric device 1 proceeds to step C8.

In step C8, the electric device 1 sends out to the portable device display information obtained by combining operation authorization information and information required to be displayed on the portable device as the electric device, and proceeds to step C9. To this display information, parity and/or a checksum or the like are/is added to provide for discrimination of the information between correct and incorrect.

In step C9, the electric device 1 is waiting for a password from the portable device 10 as a response to sending of the display information. When receiving the password from the portable device 10, the electric device 1 determines whether or not it is the correct password and returns to step C8 when it is correct, and the state of the electric device 1 authorized to operate is maintained. When the password is incorrect, the electric device 1 proceeds to step C10.

In step C10, the electric device 1 checks a series of errors of passwords, and proceeds to step C11 when the number of errors reaches a predetermined number. When the number of errors does not reach the predetermined number, the electric device 1 returns to step C8.

In step C11, the controller 3 brings the electric device 1 into a state of being prohibited to operate, and the electric device 1 returns to step C8. In this event, the display information sent out in step C8 changes from operation authorization to operation prohibition.

Meanwhile, when proceeding from step C4 to step C12, the electric device 1 checks the portable device power supply timer, proceeds to step C13 when the specified period has elapsed, and returns to step C3 when the specified period has not elapsed.

In step C13, the controller 3 turns off the switch SW3 by the switch control signal S3 to stop the operation of the portable device I/F means 16, and returns to step C3.

Also when proceeding from step C6 to step C14, the electric device 1 checks the portable device power supply timer, proceeds to step C15 when the specified period has elapsed, and returns to step C5 when the specified period has not elapsed.

In step C15, the controller 3 turns off the switch SW3 by the switch control signal S3 to stop the operation of the portable device I/F means 16 and returns to step C5.

Also in the third embodiment, it is possible to use only the ID or only the password as in the second embodiment.

When only the ID is used, steps C5, C6, C14 and C15 on the electric device 1 side and steps B3, B4, B5 and B6 on the portable device 10 side in the flowchart of FIG. 7 should be omitted, and "password" should be replaced with "ID data".

When only the password is used, steps C3, C4, C12 and C13 on the electric device 1 side and steps B1 and B2 on the portable device 10 side in the flowchart of FIG. 7 should be omitted.

Next, a fourth embodiment of an electric device according to the invention is explained with reference to FIG. 8 and FIG. 9.

Figure 8:
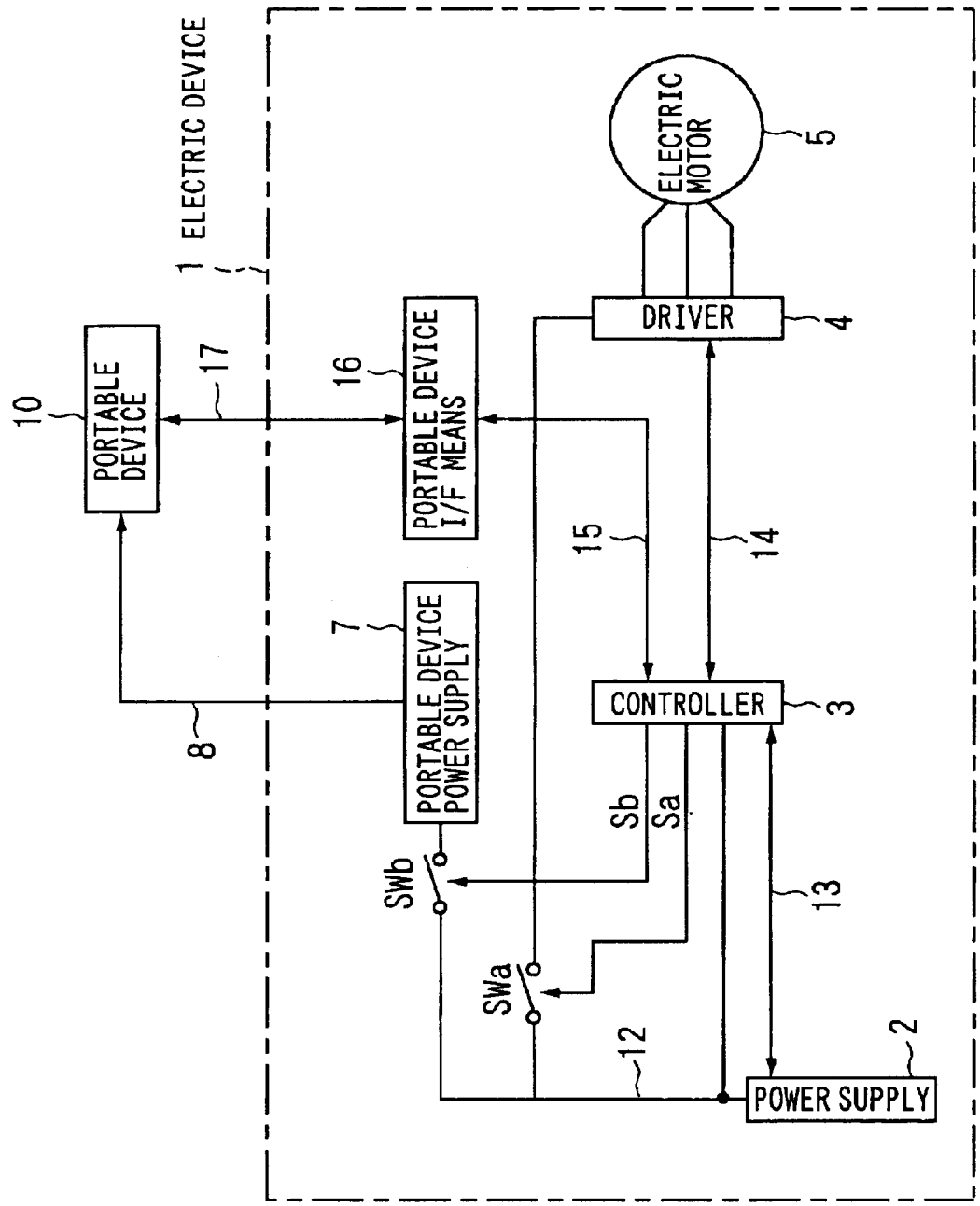
FIG. 8 is a block diagram showing a configuration of a fourth embodiment of an electric device according to the invention.

FIG. 8 is a block diagram showing a configuration of the electric device, in which the same sections as those in FIG. 1, FIG. 2 and FIG. 6 are assigned the same numerals and symbols, and the description thereof is omitted.

An electric device 1 of the fourth embodiment differs from that of the second embodiment shown in FIG. 2 only in that the key switch 6' is not provided and a switch SWa is interposed between a power supply 2 and a main power line 12 and a switch SWb is interposed between the power supply 2 and a portable device power supply 7, respectively, such that the switch SWa and the switch SWb are ON/OFF controlled by a switch control signal Sa and a switch control signal Sb from a controller 3, respectively.

It should be noted that the controller 3 is supplied with electric power at all times from the power supply 2 via a power supply control signal line 13, and periodically operates the portable device power supply 7 by the switch control signal Sb as well as verifies the presence or absence of connection of a portable device 10 using a portable device I/F means 16 via an instrument panel I/F signal line 15. When receiving a correct ID from the portable device 10, the controller 3 recognizes the connection of the portable device 10, and proceeds with processing for operation of the electric device 1.

When the controller 3 turns on the switch SWa by the switch control signal Sa, electric power from the power supply 2 is supplied to a driver 4, and when the controller 3 turns on the switch SWb by the switch control signal Sb, electric power from the power supply 2 is supplied to the portable device power supply 7.

Figure 9:
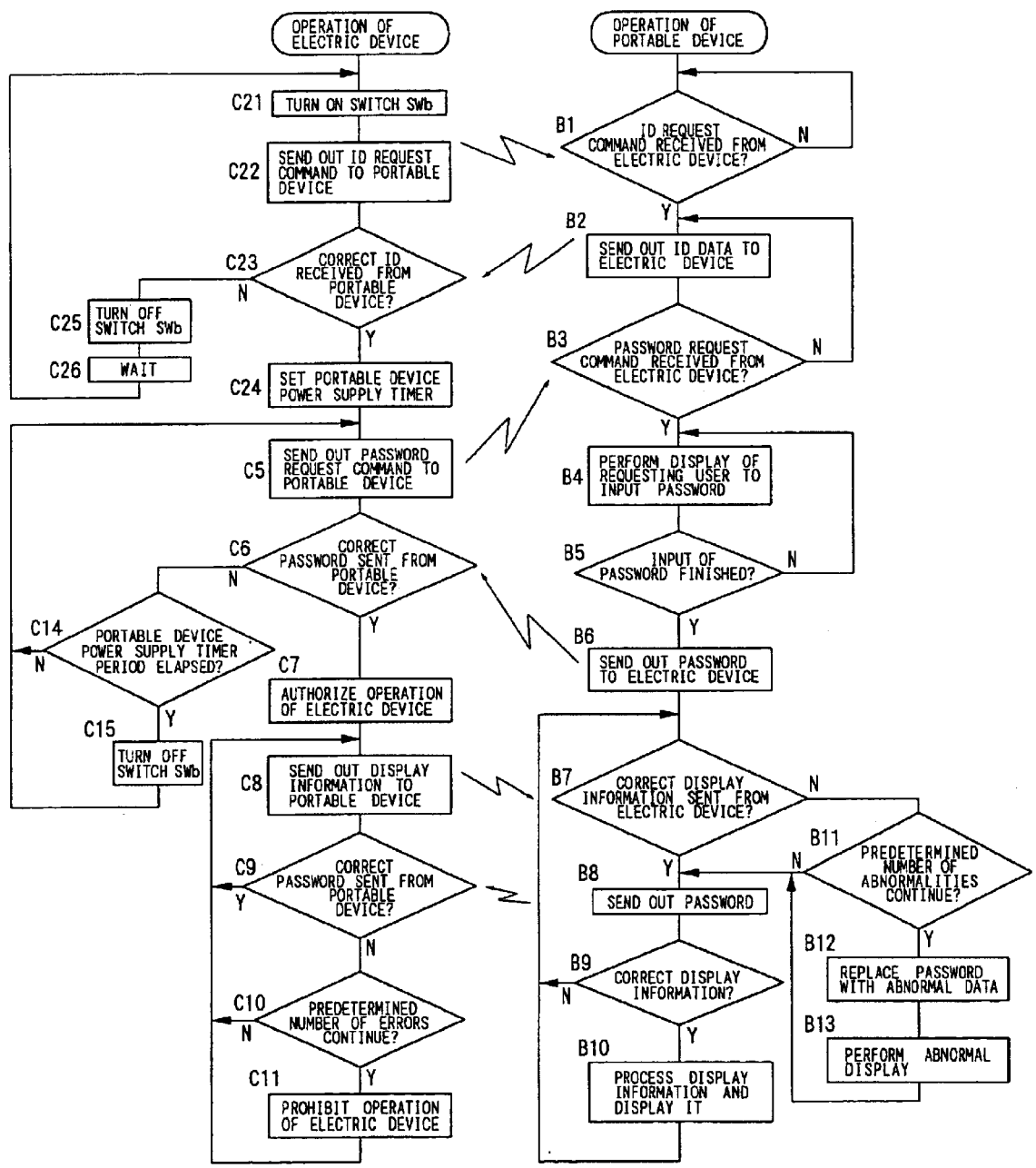
FIG. 9 is a flowchart showing operations of the electric device and a portable device shown in FIG. 8.

Operations in the fourth embodiment are explained with a flowchart in FIG. 9.

FIG. 9 shows the flowchart of the electric device from periodical checks on connection of the portable device by the electric device until it becomes a state capable of operating, and communication of the electric device with the portable device in operation.

It should be noted that steps C5 to C14 of the operation of the electric device 1 on the left-hand side are the same as steps C5 to C14 of the operation of the electric device in the flowchart shown in FIG. 7, and steps B1 to B13 of the operation of the portable device on the right-hand side are the same as steps B1 to B13 of the operation of the portable device in the flowchart shown in FIG. 7, and thus the description thereof is omitted.

In step C21, the electric device 1 turns on the switch SWb by the switch control signal Sb to cause the portable device power supply 7 to operate for the case of a battery of the portable device 10 being uncharged, and proceeds to step C22.

In step C22, the controller 3 sends out an ID request command to the portable device 10 via the instrument panel I/F signal line 15, the portable device I/F means 16, and a portable device I/F signal line 17, and waits for a response from the portable device 10 in step C23.

When receiving ID data from the portable device 10, the electric device 1 checks whether or not it is a correct ID matching a previously registered ID in step C23. The electric device 1 proceeds to step C24 when it is correct, and proceeds to step C25 when it is incorrect.

Then, the electric device 1 turns off the switch SWb in step C25, thereafter waits only for a predetermined period in step C26, and returns to step C21.

In step C24, the electric device 1 sets a portable device power supply timer for specifying a period of operation of the portable device power supply to prevent power supply (charge) to the portable device, and proceeds to step C5.

While the operation thereafter is the same as that of the electric device shown in FIG. 7, the switch SWb is turned off in step C15.

Also in the fourth embodiment, it is possible to use only the ID or only the password as in the second embodiment.

When only the ID is used, steps C5, C6, C14 and C15 on the electric device side and steps B3 to B6 on the portable device 10 side in the flowchart of FIG. 9 should be omitted, and "password" should be replaced with "ID data".

Alternatively, when only the password is used, steps C22, C23, C25 and C26 on the electric device side and steps B1 and B2 on the portable device 10 side in the flowchart of FIG. 9 should be omitted.

It should be noted that, in step C21 in FIG. 9, the switch SWb is unconditionally turned on by the switch control signal Sb to cause the portable device power supply 7 to operate for the case of the battery of the portable device 10 being uncharged. However, it is also adoptable that only when at least one or both of the ID data and the password received from the portable device matches/match the previously registered ID data or/and password, the switch SWb is turned on to cause the portable device power supply 7 to operate so as to enable the supply of electric power to the portable device 10.

Figure 10:
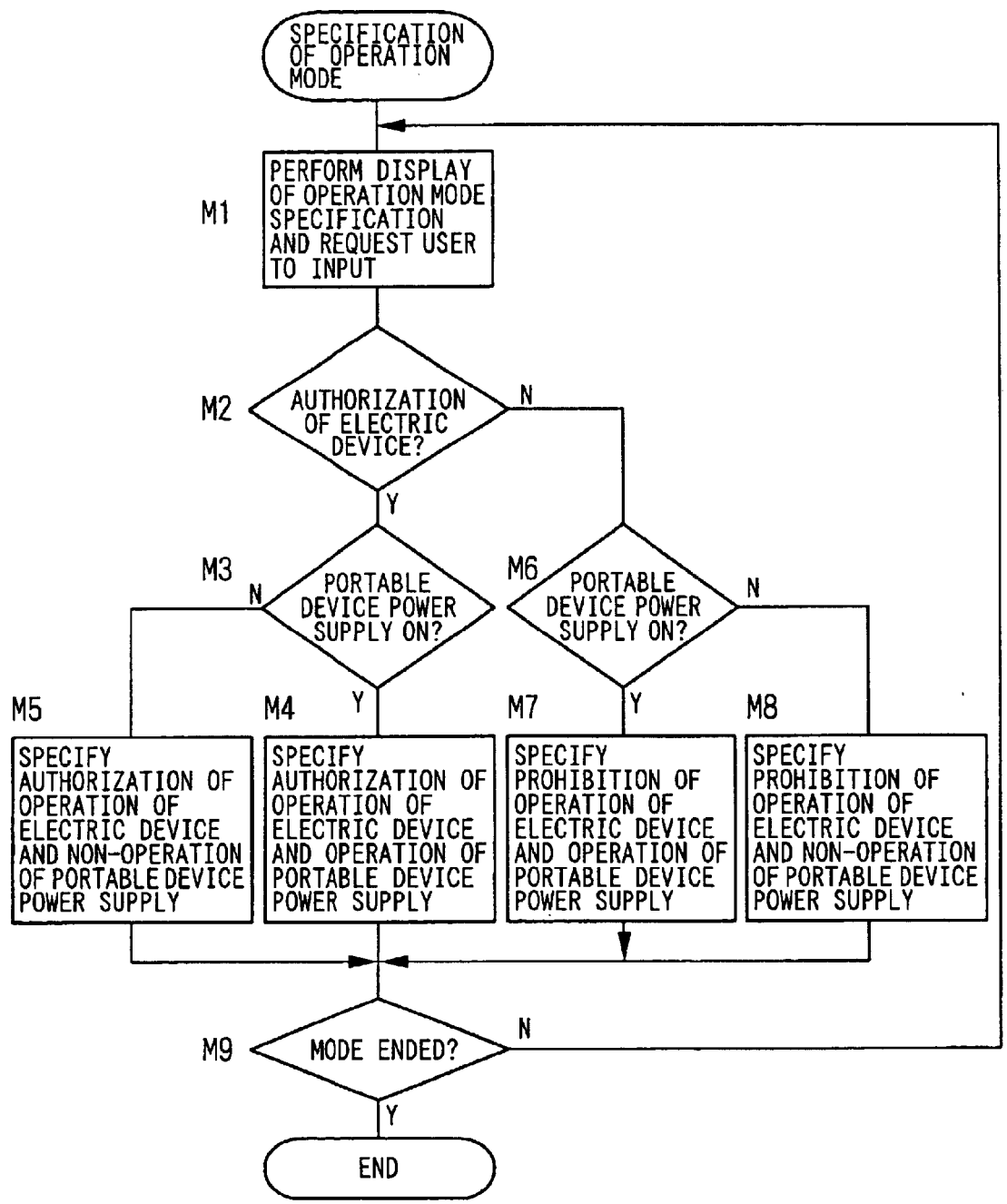
FIG. 10 is a flowchart showing processing on specification of authorization/prohibition of operation of the electric device and operation mode specification of operation/nonoperation of a portable device power supply 7 by operation from the portable device after the state in which the operation of the electric device is authorized, in the second to fourth embodiments of the electric device according to the invention.

FIG. 10 shows a flow of specification of authorization/prohibition of the operation of the electric device 1 and operation mode specification of operation/non-operation of the portable device power supply 7 by operation from the portable device 10 after the state in which the operation of the electric device 1 is authorized.

This makes it possible to specify an operation in accordance with user's will and to effectively utilize the electric power of the power supply 2. Further, by using a password for authorization of the operation, it becomes possible to prevent the operation mode from being changed by persons except an authorized user so as to prevent mischief, unauthorized use, theft, and the like.

This can be realized by any of the above-described second to fourth embodiments.

As a method for proceeding to the above operation, any method is adoptable if it is suitable for properties of the portable device, such as operation of a specific key, input of commands, or the like.

Processing in each step in FIG. 10 is explained here. First of all, a display of specifying an operation mode is performed in accordance with operation mode specification by a user in step M1, and the processing proceeds to step M2.

In step M2, specified contents by the user are judged, and when it is authorization of the electric device 1, the processing proceeds to step M3 and otherwise the processing proceeds to step M6.

In step M3, whether or not the portable device power supply 7 is ON is determined, and when it is OFF (non-operation), the processing proceeds to step M5, and when it is ON (operation), the processing proceeds to step M4.

In step M4, authorization of operation of the electric device 1 and operation of the portable device power supply 7 are specified, and the processing proceeds to step M9. In step M5, authorization of operation of the electric device 1 and non-operation of the portable device power supply 7 are specified, and the processing proceeds to step M9.

In step M6, whether or not the portable device power supply 7 is ON is determined, and when it is ON (operation), the processing proceeds to step M7, and when it is OFF (non-operation), the processing proceeds to step M8. In step M7, prohibition of operation of the electric device 1 and operation of the portable device power supply 7 are specified, and the processing proceeds to step M9. In step M8, prohibition of operation of the electric device 1 and non-operation of the portable device power supply 7 are specified, and the processing proceeds to step M9.

In step M9, whether or not the operation mode is ended is determined, and when it is not ended, the processing returns to step M1 and when it is ended, the processing is ended.

Some of the above-described embodiments are explained in examples each using a secondary battery composed of a typical storage battery pack as the power supply of the electric device in a small mobile unit. However, it is preferable to use a rechargeable secondary battery constituted by paring a secondary battery composed of a storage battery pack and a memory for storing at least information about charge and discharge states of the storage battery pack.

This makes it possible to supply power sufficiently to the portable device connected to the portable device power supply and to manage the power supply of the electric device, so as to utilize the power supply further effectively.

Figure 11:
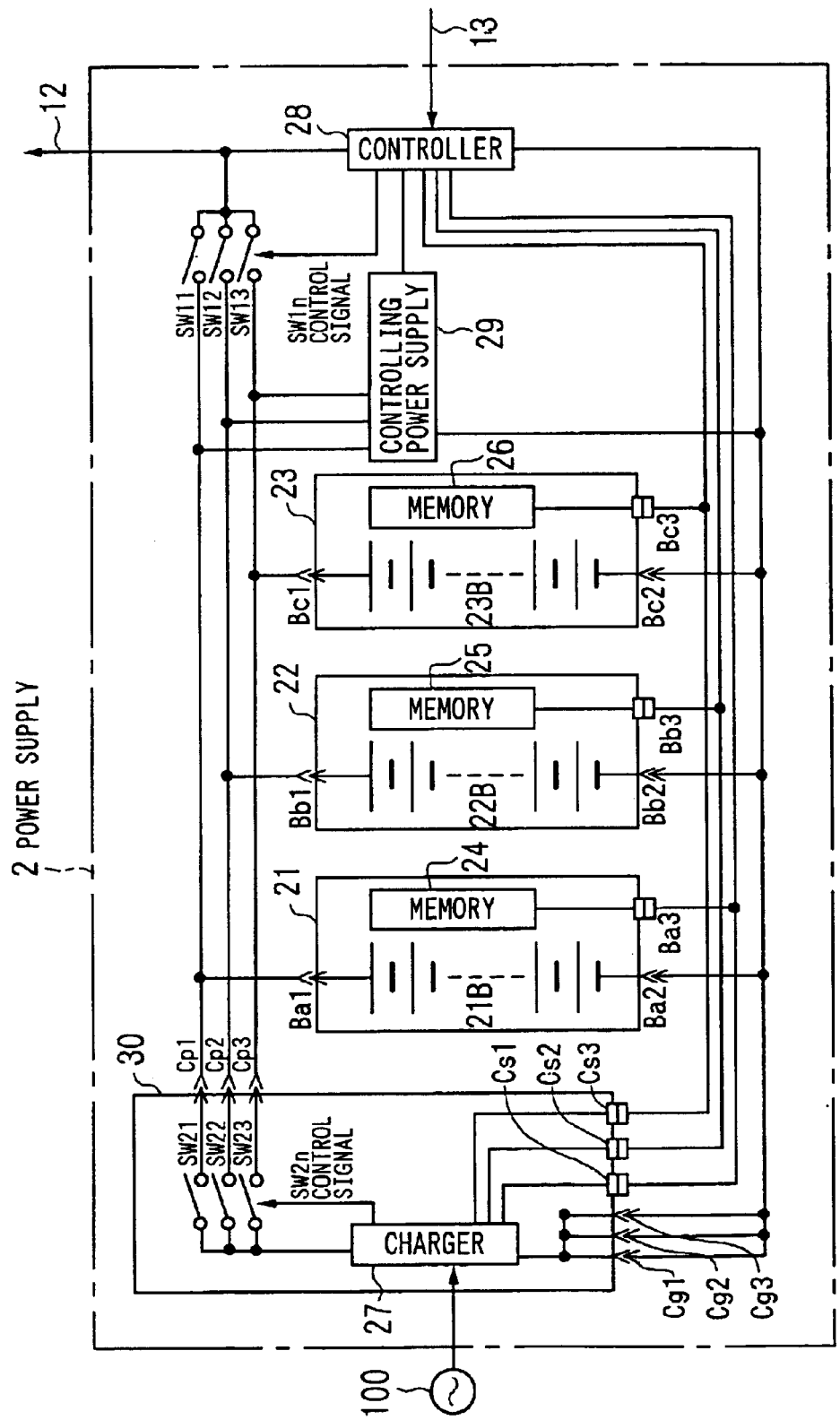
FIG. 11 is a block circuit diagram showing a configuration example of a power supply used in each embodiment of the electric device according to the invention.

FIG. 11 is a block circuit diagram showing a configuration example of the power supply. The power supply 2 is constituted by battery units 21, 22 and 23, a controlling power supply 29, a controller 28, a charger unit 30 including a charger 27, and so on.

Storage battery packs 21B, 22B and 23B may include various types of secondary batteries such as a nickel-cadmium battery and a nickel-metal hydride battery. Further, each of memories 24, 25 and 26 is a nonvolatile memory such as an EEPROM, a flash ROM, a RAM backed up by a battery or the like, into which various kinds of information can be written which includes at least the information about charge and discharge states of the associated storage batter pack by the charger or the controller 28 provided in the power supply 2.

As for the battery units 21, 22 and 23, the charge and discharge states of the storage battery packs 21B, 22B and 23B included therein can be recognized precisely by referring to the information stored in the memories 24, 25 and 26 even when they are mounted on the electric device 1 or they are detached therefrom to be in a single state, and thus appropriate charge and discharge controls can be conducted all the time.

The power supply 2 of this embodiment has the plurality of battery units 21, 22 and 23 and the common charger unit 30 for charging the respective storage battery packs 21B, 22B and 23B, which are detachably mounted on the electric device main body, respectively.

The battery units 21, 22 and 23, having the same structure, are units in which the storage battery packs 21B, 22B and 23B are paired for integration with the memories 24, 25 and 26 such as EEPROMs or the like. The battery units 21, 22 and 23 and battery unit installation sections (not shown) of the above-described power supply 2 provided in the electric device 1 are provided respectively with connectors Ba1, Ba2 and Ba3, connectors Bb1, Bb2 and Bb3, and connectors Bc1, Bc2 and Bc3, each of which is composed of paired terminals, as means for electrically connecting and disconnecting the battery units 21, 22 and 23 to/from the main body side of the power supply 2 incident to attachment and detachment of the battery units 21, 22 and 23, respectively.

The charger unit 30 is a unit containing therein the charger 27 having a microcomputer and switches SW21, SW22 and SW23 corresponding to the battery units 21, 22 and 23, and is provided with connectors Cp1, Cp2, Cp3, Cg1, Cg2, Cg3, Cs1, Cs2 and Cs3, each of which is composed of paired terminals, between the charger unit 30 and the charger unit installation sections (not shown) of the power supply 2, as connecting means for electrically connecting and disconnecting the charger unit 30 to/from the main body side of the power supply 2 incident to attachment and detachment of the charger unit 30.

Further, the connectors Cs1, Cs2 and Cs3 of the charger unit 30 and the connectors Ba3, Bb3 and Bc3 of the battery units 21, 22 and 23 are connected to each other respectively, that is, the connectors Cs1 and Ba3, the connectors Cs2 and Bb3, and the connectors Cs3 and Bc3, by bus lines for writing and reading to/from the memories 24, 25 and 26, and further connected to the controller 28.

Furthermore, the power supply 2 is provided with, on the main body side, the controller 28 for controlling the operation of the whole power supply 2, the main power line 12 for supplying electric power to each section of the electric device 1 via the controlling power supply 29 connected to the controller 28 and the above-described switch SW and so on, and three switches SW11, SW12 and SW13 interposed in discharge (feed) lines from the battery units 21, 22 and 23 to the controller 28 and the main power line 12.

The charger 27 in the charger unit 30 has a function of charge controlling the storage battery packs 21B, 22B and 23B of the battery units 21, 22 and 23, and a function of reading and writing information from/into the memories 24, 25 and 26.

Further, the controller 28 similarly has therein a function of reading and writing information from/into the memories 24, 25 and 26 of the battery units 21, 22 and 23 in addition to a function of controlling the whole power supply 2.

The charger 27 receives a supply of alternating-current power from a commercial power supply 100, rectifies and smoothes it to thereby make it direct current, converting it to an output voltage suitable for charge. Further, the charger 27 reads and temporarily stores the information about the charge and discharge states of the storage battery packs 21B, 22B and 23B from the memories 24, 25 and 26 of the plurality of the mounted battery units 21, 22 and 23, and selectively turns on one of the switches SW21, SW22 and SW23 by a SW2n control signal to charge the storage battery pack of the battery unit selected based on the information. Thereby, the storage battery pack of the battery unit connected via the switch turned on is charged.

FIG. 11 shows an example in which three battery units are mounted, but the object of the invention can be achieved by mounting at least one battery unit. In addition, the charger unit 30 is also detachably mounted on the main body of the power supply 2, so that it can easily be detached from the electric device 1 and used outside the electric device 1, but it may be provided fixedly to the main body of the power supply 2 provided in the electric device 1.

Each of the storage battery packs 21B, 22B and 23B of the battery units 21, 22 and 23 is constituted by connecting in series a plurality of rechargeable storage batteries or secondary batteries.

In each of the memories 24, 25 and 26 of the battery units 21, 22 and 23, information specific to a battery such as a rated capacity, temperature characteristics, preservation characteristics and the like, and information about the charge and discharge states of the battery such as an amount of charge, an amount of discharge, the numbers of charges and discharges and the like of each of the storage battery packs 21B, 22B and 23B, are stored.

As described above, the battery units 21, 22 and 23 have individual information respectively, which allows the plurality of the battery units 21, 22 and 23 to be attached and detached in any order. The switches SW11, SW12 and SW13, which are provided along respective feed lines between the battery units 21, 22 and 23, and, the controller 28 and the main power line 12, are selectively turned on by an SW1n control signal outputted based on the controlling function of the controller 28, thereby selecting which battery unit is used to feed power to the controller 28 and the main power line 12.

The controller 28, having a microcomputer therein, detects installation states of the plurality of the battery units 21, 22 and 23 by the controlling function in conjunction with the reading/writing function, reads and temporarily stores the information stored in the memories 24, 25 and 26 therein, selects based on the information a battery unit to be discharged, and controls its discharging current and discharging voltage, to thereby conduct management appropriate for the battery characteristics of the battery unit used and the characteristics of the power supply 2 when necessary.

Further, it is also possible to display information on the mounted battery units, for example, the battery residual capacity of the individual or the total of the plurality of the mounted battery units, charge request when there is a battery unit required to be charged and the like, or to give an alarm and the like, when necessary. In other words, this controller 28 has functions of controlling ON/OFF states of the switches SW11, SW12 and SW13 and managing and controlling the whole power supply, based on the information stored in the memories 24,25 and 26 of the battery units 21, 22 and 23.

Further, the controller 28 is also coupled to the controller 3 for controlling the whole electric device 1 shown in FIG. 1, FIG. 2, FIG. 6 and FIG. 8 via the power supply control signal line 13, so as to exchange information and a command.

The controlling power supply 29 has a function of supplying required electric power to the controller 28 when at least one of the battery units 21, 22 and 23 is mounted on the power supply 2. The controlling power supply 29 is supplied with electric power also when at least one storage battery pack among the battery units is charged by the charger 27, and in this event the controlling power supply 29 operates when necessary to supply electric power to the controller 28.

Further, when each of the battery units 21, 22 and 23 is detached or when a command to stop the power supply 2 is given or the like, the controlling power supply 29 supplies electric power to the controller 28 until the controller 28 stops the supply of electric power to the main power line 12, writes information about charge and discharge states and the like of the storage battery packs of operating battery units among the battery units 21, 22 and 23 into the memories in the battery units, and stops the power supply 2 in safety and the like to thereby complete necessary processing.

Thus, the electric power supplied from the power supply 2 via the main power line 12 based on the controlling function of the controller 28 is supplied to the controller 3 and the driver 4 via the switch SW1 by operation of the key switch in the first embodiment shown in FIG. 1.

Further, as explained in the above-described first to fourth embodiments, electric power is supplied to each section of the electric device 1 via the main power line 12 and also to the portable device power supply 7, which makes it possible to supply electric power to the portable device 10 connected thereto.

The power supply 2 may comprise: a plurality of battery units detachably mounted thereon, each battery unit constituted by integrating a storage battery pack, a memory for storing at least information about charge and discharge states of the storage battery pack, and a charger for charging the storage battery pack; connectors, provided on each battery unit and a battery unit installation section on the device main body side, for performing electrical connection/disconnection to/from the device main body side incident to attachment/detachment of the battery unit; and a driver for driving a load and a controller for controlling a supply of electric power from each battery unit to the driver by referring to the information stored in the memory of each mounted battery unit, which are provided on the device main body side.

Alternatively, it is, of course, adoptable to fixedly provide each battery unit and the charger unit constituting the power supply 2 to the main body of the electric device 1.

Industrial Applicability

As has been described, according to the invention, the provision of a portable device power supply in an electric device enables supply (charge) of electric power to a portable device even in a small electric device.

Further, the portable device connected via a portable device I/F signal line can also be used as a display device of the electric device.

Furthermore, in addition to a key switch, an ID of the portable device or its operation program is sent/received to/from the electric device, so as to prevent unauthorized use and/or theft.

Additionally, by using an inputting function of the portable device, it is also possible to improve safety through the use of a password.

What is claimed is:

1. An electric device having a power supply including a rechargeable secondary battery, an electric motor operated by electric power supplied from said power supply, a driver for driving said electric motor, and a controller for monitoring, managing, and controlling said driver and said electric device, comprising:
    a portable device power supply to which a portable device is connectable and which supplies electric power to said connected portable device;
    a second switch (SW2) turned on when a key is inserted into a key hole and turned to a first key position (ON1) or further turned to a second key position (ON2);
    a first switch (SW1) turned on only when the key is turned to said second key position (ON2); and
    a key switch interlocking with a lock mechanism for an operating system including a steering wheel, the key of which can be pulled out in a predeterrnined turning range including said first key position (ON1),
    wherein said first switch (SW1) is interposed in a main power line for supplying electric power from said power supply to said controller and said driver, and said second switch (SW2) is interposed in a power line for supplying electric power from said power supply to said portable device power supply.

2. The electric device according to claim 1,
    wherein said power supply comprises a rechargeable battery unit constituted by paring a storage battery pack being said secondary battery and a memory for storing at least information on charge and discharge states of said storage battery pack.

3. An electric device system comprising:
    an electric device having a power supply including a rechargeable secondary battery, an electric motor operated by electric power supplied from said power supply, a driver for driving said electric motor, a controller for monitoring, managing, and controlling said driver and said electric device, a portable device power supply which supplies to said connected portable device electric power supplied from said power supply, and a portable device interface means for communicating information with said connected portable device; and
    a portable device connected to said portable device power supply, which communicates information with said electric device via said portable device interface means and comprises a display for displaying display information communicated from said electric device,
    wherein said electric device is provided with means for sending out to said portable device display information obtained by combining operation authorization information and information required to be displayed on said portable device after authorizing operation of said electric device, then verifying a password when receiving the password from said portable device, continuing to send out said display information if the password is correct, continuing to send out said display information until number of errors reaches a predetermined number if the password is incorrect, and prohibiting operation of said electric device when the number of errors reaches said predetermined number, and
    wherein said portable device is provided with means for checking display information when receiving the display information from said electric device, processing said display information and displaying it after sending out a predetermined password to said electric device if the display information is correct, waiting for reception of next display information after sending out said password to said electric device until number of reception of abnormal display data reaches a predetermined number if the display information in incorrect, and sending out an abnormal data instead of said password to said electric device after rewriting the abnormal data over said password and displaying an abnormality when the number of reception of abnormal display data reaches said predetermined number.

4. The electric device system according to claim 3,
    wherein said portable device is provided with means for sending out ID data of a program operating therein to said electric device, and
    wherein said electric device is provided with means for determining authorization/prohibition of operation of said electric device based on the ID data received from said portable device.

5. The electric device system according to claim 3,
    wherein said power supply of said electric device comprises a rechargeable battery unit constituted by paring a storage battery pack being said secondary battery and a memory for storing at least information on charge and discharge states of said storage battery pack.

6. The electric device system according to claim 3,
    wherein said portable device is provided with means for sending out an inputted password to said electric device, and
    wherein said electric device is provided with means for determining authorization/prohibition of operation of said electric device based on the password received from said portable device.

7. The electric device system according to claim 6,
    wherein said power supply of said electric device comprises a rechargeable battery unit constituted by paring a storage battery pack being said secondary battery and a memory for storing at least information on charge and discharge states of said storage battery pack.

8. The electric device system according to claim 3,
    wherein said portable device is provided with means for sending out ID data of a program operating therein to said electric device and means for sending out an inputted password to said electric device, and
    wherein said electric device is provided with means for determining authorization/prohibition of operation of said electric device based on the ID data and the password received from said portable device.

9. The electric device system according to claim 8,
    wherein said electric device is provided with a switch for controlling a supply of electric power from said power supply to said portable device power supply, and means for enabling electric power supply from said portable device power supply by turning on said switch when at least one of the ID data and the password received from said portable device matches a previously registered ID data or password.

10. The electric device system according to claim 9,
wherein said power supply of said electric device comprises a rechargeable battery unit constituted by paring a storage battery pack being said secondary battery and a memory for storing at least information on charge and discharge states of said storage battery pack.

11. The electric device system according to claim 8,
wherein said power supply of said electric device comprises a rechargeable battery unit constituted by paring a storage battery pack being said secondary battery and a memory for storing at least information on charge and discharge states of said storage battery pack.

12. The electric device system according to claim 3,
wherein said portable device is provided with means for sending out inputted operation mode specification information to said electric device, and
wherein said electric device is provided with means for controlling the operation of said electric device and/or operation of said portable device power supply in accordance with the operation mode specification information from said portable device.

13. The electric device system according to claim 12,
wherein said power supply of said electric device comprises a rechargeable battery unit constituted by paring a storage battery pack being said secondary battery and a memory for storing at least information on charge and discharge states of said storage battery pack.

14. The electric device system according to any one of claim 4 to claim 9,
wherein said power supply of said electric device comprises a rechargeable battery unit constituted by paring a storage battery pack being said secondary battery and a memory for storing at least information on charge and discharge states of said storage battery pack.

* * * * *

UNITED STATES PATENT AND TRADEMARK OFFICE
CERTIFICATE OF CORRECTION

PATENT NO. : 6,762,572 B1
DATED : July 13, 2004
INVENTOR(S) : Hiroshi Ishii et al.

It is certified that error appears in the above-identified patent and that said Letters Patent is hereby corrected as shown below:

<u>Column 18,</u>
Line 15, please change "information in incorrect" into -- informaiton is incorrect --.

Signed and Sealed this

Eighth Day of February, 2005

JON W. DUDAS
*Director of the United States Patent and Trademark Office*